(12) United States Patent
DelConte et al.

(10) Patent No.: US 12,130,025 B2
(45) Date of Patent: Oct. 29, 2024

(54) MODULAR HYDRONIC HEATING SYSTEM CORE

(71) Applicant: F. W. Webb Company, Bedford, MA (US)

(72) Inventors: Michael Weaver DelConte, Medway, MA (US); Eric J. Duguay, Lebanon, ME (US); Todd S. Hallock, Saco, ME (US); Nicholas James Pelletier, Clinton, ME (US); Gregory Samuel Thompson, South Portland, ME (US); Patrick A. Reilly, Windsor, ME (US)

(73) Assignee: F.W. Webb Company, Bedford, MA (US)

( * ) Notice: Subject to any disclaimer, the term of this patent is extended or adjusted under 35 U.S.C. 154(b) by 301 days.

(21) Appl. No.: 17/495,159

(22) Filed: Oct. 6, 2021

(65) Prior Publication Data

US 2023/0106143 A1   Apr. 6, 2023

(51) Int. Cl.
*F24D 3/10* (2006.01)
*F24D 3/02* (2006.01)
(Continued)

(52) U.S. Cl.
CPC .................. *F24D 3/10* (2013.01); *F24D 3/02* (2013.01); *F24D 19/0092* (2013.01); *F24D 19/1015* (2013.01); *F24D 2220/0228* (2013.01)

(58) Field of Classification Search
CPC .......... F24D 3/1066; F24D 3/12; F24D 3/125; F24D 19/1012
(Continued)

(56) References Cited

U.S. PATENT DOCUMENTS 5,819,542 A  10/1998 Christiansen et al.
6,237,855 B1 * 5/2001 Stickney ............. F24D 19/1012
                                              237/8 R
(Continued)

OTHER PUBLICATIONS

Discal Dirt air and dirt separator 546 Series—Specification Sheet. (Year: 2023).*
(Continued)

*Primary Examiner* — Steven B McAllister
*Assistant Examiner* — John E Bargero
(74) *Attorney, Agent, or Firm* — Davis, Malm & D'Agostine, P.C.; Richard L. Sampson

(57) ABSTRACT

A modular hydronic system core system and method includes a hydronic fluid flow conduit with closely spaced tees and distribution supply and return portions on a substrate. A supply manifold is coupled to branch feeders that support a circulator pump or zone valve. An ECM circulator along the conduit includes a Bluetooth transmitter to capture and transmit fluid flow rate and pressure. A return manifold includes branch returns with purge/shutoff valves. The branch feeders and returns are connectable to a distribution system having heating elements. Air and dirt separators, and an iron remover remove air, dirt and iron from the fluid. An expansion tank bracket supports a pressure gauge and expansion tank. A zone relay is coupled to the ECM circulator and zone valves on the branch feeders, and includes thermostat terminals. The zone relay captures inputs from the thermostats to control operation of the ECM circulator and zone valves.

12 Claims, 5 Drawing Sheets

(51) Int. Cl.
*F24D 19/00* (2006.01)
*F24D 19/10* (2006.01)

(58) Field of Classification Search
USPC .......................................................... 237/56
See application file for complete search history.

(56) References Cited

U.S. PATENT DOCUMENTS

| | | | |
|---|---|---|---|
| 6,347,748 B1 * | 2/2002 | Lyons | F24D 3/1066 |
| | | | 237/69 |
| 7,284,709 B2 | 10/2007 | Guyer | |
| 8,770,223 B2 | 7/2014 | Reck | |
| 10,677,674 B2 | 6/2020 | Stevens | |
| 10,876,739 B2 | 12/2020 | Pichette | |
| 2019/0107292 A1 * | 4/2019 | Mischler | F24D 10/003 |

OTHER PUBLICATIONS (JPEG) Off-Grid Supply, website offgridsupply.ca/parts/boiler-boards/; last accessed Aug. 2, 2022.
(JPEG) Webstone Hydro-Core, undated.
John Siegenthaler, PE; Piping Layouts for Hydronic Heat; The Journal of Light Construction; JLC Online; Mar. 1, 1995; 8 pages. (last accessed Aug. 2, 2022).
"Hydraulic Separation: Beyond Primary/Secondary Piping", Caleffi Hydronic Solutions; Webinar; Oct. 2007; 26 pages.
Matos, Taina, ISA/US; International Search Report and Written Opinion for PCT/US2022/074947 mail date Nov. 7, 2022; all references cited therein; pp. 1-11.

* cited by examiner

MODULAR HYDRONIC HEATING SYSTEM CORE

BACKGROUND

Technical Field

This invention relates to heating and cooling systems and/or combination heating & domestic hot water systems, and more particularly to modular components for hydronic heating systems.

Background Information

Hydronic systems utilize a fluid to shift energy (i.e. BTUs) from one location to another. Typically this is accomplished by heating up (or in cooling applications, cooling) a liquid, such as water, or a mixture of water and other fluids (such as glycol antifreeze) to elevate the boiling point and lower the freezing point, and pumping this fluid to another location where the captured energy is released. The hydronic fluid can be heated through the use of a boiler, solar energy, geothermal pump, or any other means. The hydronic fluid may be cooled by use of a heat pump, geothermal pump, or other such means. Hydronic heating systems have gained popularity due to the comfortable average temperature they provide. Water or a water-based fluid is heated in a boiler and distributed to loops of tubing in the dwelling that carry the heat to a heat emitter that releases the heat by radiation, conduction and/or convection to the rooms in the dwelling.

As shown in FIG. 1, hydronic systems commonly include a conventional cast iron boiler 10 that feeds hot water to a supply portion 12 of a zoned distribution system 14 with heating loops with heating elements such as radiators 15 (FIG. 2). The cooled water from the heating loops is then returned to boiler 10 through a return portion 16 of the distribution system. The return water is heated in the boiler 10 and sent out again to the distribution system 14 as hot supply water, and so the water is cycled through the essentially closed system. One or more circulator pumps 18 in this system keep the water flowing and/or valves 20 control fluid flow rates through the loops depending on demand for heat.

A heating loop may include several heating elements such as baseboard finned tubing or wall mounted radiators 15 (FIG. 2) that are the principal heat exchanger of the loop, or the tubing itself may be the principal heat exchanger of the loop. In the latter case the tubing may be installed on top of or under the rough floor or in the wall, e.g., Radiant Floor Heating (RFH) or Radiant Wall Heating (RWH), respectively. RFH is popular for indoor applications due to its user-comfort, and in outdoor applications to remove snow and ice from walkways and driveways.

These heating elements tend to create pressure drops due to their flow resistance, such as during operation of their respective pumps 18. Conventional cast iron boilers 10 have relatively low flow resistance and are generally able to compensate for these pressure drops.

Modern compact/condensing boilers tend to have significantly higher flow resistance than cast iron boilers. If they are simply substituted for cast iron boilers in a conventional zoned distribution system such as shown in FIG. 1, problems are likely to develop, e.g., due to interference between simultaneously operating circulator pumps 18.

It is thus difficult to provide complex modular components such as pre-assembled hydronic system cores (e.g., in the form of boiler boards) that are suitable for use with both types of boilers. A need therefore exists for modular hydronic system cores that address the foregoing drawbacks.

SUMMARY

In one aspect of the present invention, a modular pre-assembled, pre-fabricated, hydronic system core boiler board includes a wall mountable substrate supporting a hydronic fluid flow conduit configured to convey a hydronic heat transfer fluid therethrough. The fluid flow conduit includes a header with closely spaced tees, disposed in fluid communication with a distribution supply and return portions, wherein the heat transfer fluid is configured to flow in a downstream direction from the header to the distribution supply portion, and from the distribution return portion to the header. Boiler supply and return ports extend from the header in fluid communication with the distribution supply and return portions, respectively, to form the closely spaced tees. The distribution supply portion includes a supply manifold coupled to a plurality of parallel branch feeders, each configured for supporting a circulator pump or a zone valve. At least one ECM (Electronically Commutated Motor) circulator pump is disposed along the fluid flow conduit to pump the fluid therethrough. A Bluetooth transmitter coupled to the EMC circulator pump is configured to capture and transmit flow rate and pressure of the fluid. The distribution return portion includes a return manifold coupled to a plurality of parallel branch returns, each including a purge/shutoff valve. The parallel branch feeders and parallel branch returns are configured for connection to a distribution system having heating elements. The distribution supply portion includes an air separator, a dirt separator, and an iron remover, to remove air, dirt and iron from the fluid. An expansion tank bracket with gauge mount is configured to support a pressure gauge and an expansion tank. A zone relay is communicably coupled to the at least one ECM circulator pump and any zone valves supported by the parallel branch feeders, the zone relay including a plurality of thermostat terminals respectively configured for being communicably coupled to a plurality of thermostats. The zone relay is configured to capture inputs from the plurality of thermostats to control operation of the at least one ECM circulator pump and any zone valves supported by the parallel branch feeders.

In another aspect of the invention a method is provided for producing a modular pre-assembled, pre-fabricated, hydronic system core boiler board. The method includes disposing a hydronic fluid flow conduit on a wall mountable substrate to convey a hydronic heat transfer fluid therethrough, and configuring the fluid flow conduit to include a header with closely spaced tees, disposed in fluid communication with distribution supply and return portions, wherein the heat transfer fluid is configured to flow in a downstream direction from the header to the distribution supply portion, and from the distribution return portion to the header. Boiler supply and return ports extend from the header to form the closely spaced tees. The distribution supply portion is provided with a supply manifold communicably coupled to a plurality of parallel branch feeders for supporting a circulator pump or a zone valve. At least one ECM (Electronically Commutated Motor) circulator pump is disposed along the fluid flow conduit to pump the fluid therethrough. A Bluetooth transmitter is communicably coupled to the at least one EMC circulator pump to capture and transmit flow rate and pressure of the fluid. The distribution return portion is provided with a return manifold communicably coupled to a plurality of parallel branch returns each having a purge/shutoff valve. The parallel branch feeders and parallel branch returns are configured for being disposed in fluid communication with a distribution system having heating elements. The distribution supply portion is provided with an air separator, a dirt separator, and an iron remover, to remove air, dirt and iron from the fluid. An expansion tank bracket with gauge mount, disposed on the substrate and in fluid communication with the conduit and with a water feeder, to support a pressure gauge and an expansion tank thereon. A zone relay is communicably coupled to the at least one ECM circulator pump and any zone valves supported by the parallel branch feeders, the zone relay including a plurality of thermostat terminals respectively configured for being communicably coupled to a plurality of thermostats, the zone relay configured to capture inputs from the plurality of thermostats to control operation of the at least one ECM circulator pump and any zone valves supported by the parallel branch feeders.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
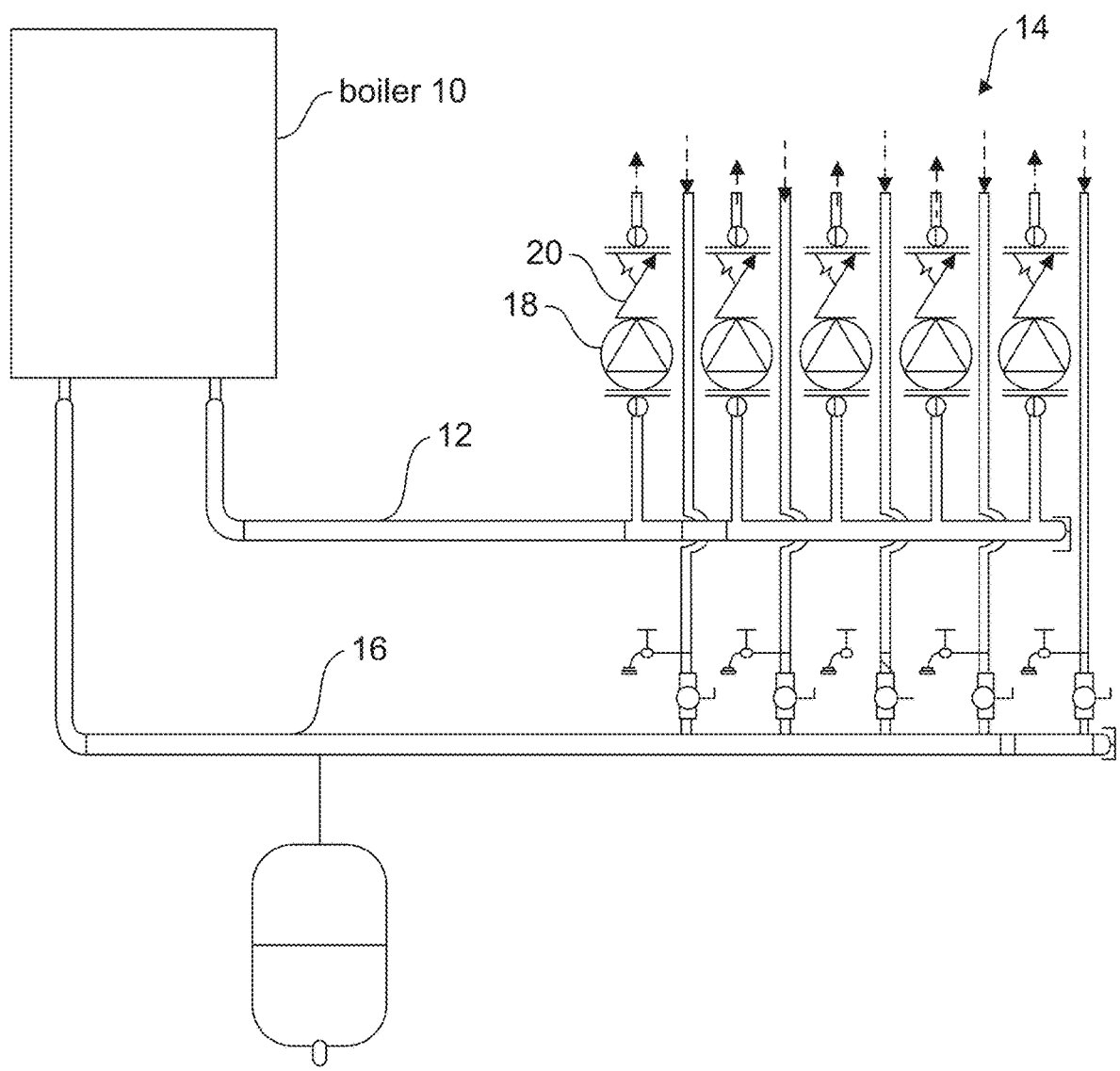
FIG. 1 is a schematic diagram of hydronic heating system components of the prior art.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the scope of the present invention. In addition, well-known structures and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. For example, reference to "an analyzer" includes a plurality of such analyzers. In another example, reference to "an analysis" includes a plurality of such analyses.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

General Overview

The present inventors have recognized that issues associated with pressure drop across individual loops of zoned hydronic distributions systems may be addressed by the use of primary/secondary ("P/S") piping systems that isolate the pressure differentials across circulator pumps relative to one another. P/S piping allows any pump in the system to operate with little, if any, tendency to induce flow, or even disturb flow, in other loops. As such, a significant distinction between multizone hydronic systems using modern compact/condensing boilers and conventional cast iron boilers is the need to provide primary and secondary piping with hydraulic separation therebetween for the former, while such is not required for the latter. The instant inventors further recognized that although the desired hydraulic separation may be provided by a conventional hydraulic separator, it may also be provided in a manner that effectively enables the same piping to be easily converted from a primary/secondary arrangement, to a conventional primary piping arrangement. Such a method and apparatus may be used to provide a pre-fabricated, pre-wired, modular component that forms the core of a hydronic heating system, as described hereinbelow.

Terminology

As used herein, the term 'closely spaced tees' refers to fluid flow path configurations in which two branches from a single flow path in a T shaped arrangement are spaced apart from each other such that center lines of each of the branches are less than about four times the diameter of the single flow path from which they branch. Those skilled in the art should appreciate that using closely spaced tees in a closed loop system creates a hydraulic separation that helps to mitigate pressure drops between the tees by creating and/or maintaining separate flow paths through each of the tees, as shown and described hereinbelow. Closely spaced tees are described in U.S. Pat. No. 8,770,223 entitled 'Purge/Fill Valve With a Main Valve Portion Aligned With a Tee', which is hereby incorporated by reference into the present disclosure.

Figure 2:
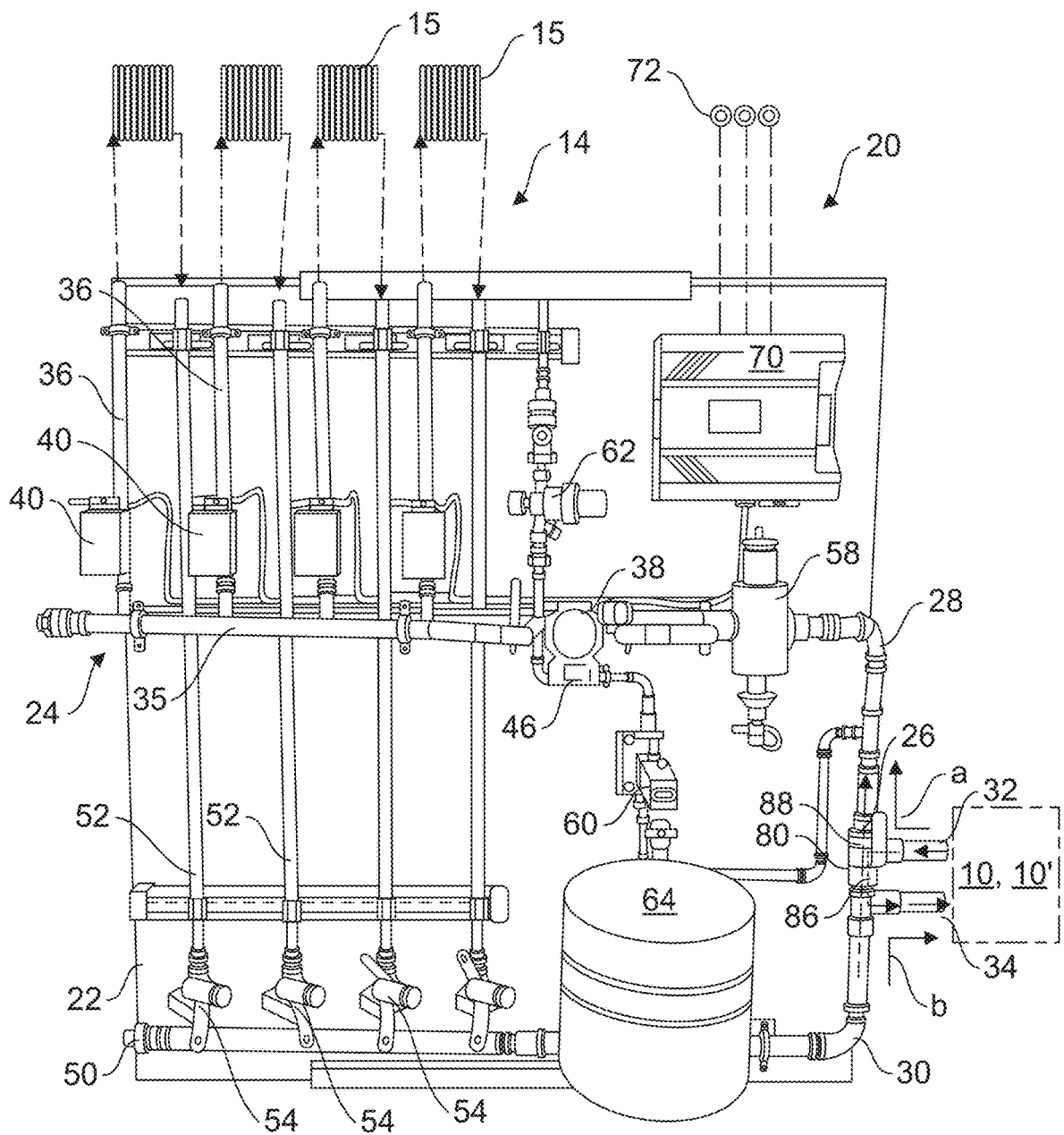
FIG. 2 is an elevational view of an embodiment of the present invention, with components with which the embodiment is used shown in phantom.

Referring now to FIGS. 2-5, embodiments of the present invention will be described. Turning to FIG. 2, particular embodiments include a modular pre-fabricated, pre-wired modular component that forms the core of a hydronic heating system, is shown as a boiler board 20, which is usable with either cast iron or compact (condensing) boilers. Boiler board 20 includes a wall mountable substrate 22, supporting a hydronic fluid flow conduit 24 thereon, to convey a hydronic heat transfer fluid such as water, via supply and return branches 36 and 52, to a zoned distribution system 14 (shown in phantom) within a premises to be heated. The zoned distribution system 14 includes heating elements such as baseboard finned tubing or wall mounted radiators 15. Boiler board 20 thus forms the core of a hydronic heating system that is installed as a unit at the premises in a plug-and-play manner, where it is then simply connected to distribution system 14, boiler 10, 10', and to thermostats 72, to form a complete hydronic system as shown and described in greater detail hereinbelow.

In the embodiment shown, the conduit 24 includes a header 26 with closely spaced tees, disposed in fluid communication with a distribution supply portion 28 and with a distribution return portion 30, in which the heat transfer fluid flows in a downstream direction from the header 26 to the distribution supply portion 28 as shown at arrow a, and from the distribution return portion 30 to the header 26 as shown at arrow b. The closely spaced tees are formed by a boiler supply port 32 extending from the header 26 in fluid communication with the distribution supply portion 28, and by a boiler return port 34 extending from the header 26 in fluid communication with the distribution return portion 30. Those skilled in the art will recognize that the supply and return portions 28 and 30, are configured for being communicably coupled to the supply and return, respectively, of a boiler 10 (shown in phantom).

The distribution supply portion 28 includes a supply manifold 35 communicably coupled to a plurality of parallel branch feeders 36 that each support an ECM (Electronically Commutated Motor) circulator pump 38 (FIG. 3), or a zone valve 40, in fluid communication therewith. It should be recognized that ECM circulator pumps offer intelligent speed control to automatically adjust their output to changing demand, whether it be due to outside temperature, level of sunlight, overall activity, and/or other heating sources, for substantial energy savings relative to conventional circulator pumps. Exemplary ECM circulator pumps 38 include the Taco 007E or 0018 ECM Circulator Pumps (Taco Comfort Solutions, Cranston, RI). Exemplary zone valves 40 include the Taco Sentry Zone Valve Z075C2-1 and the Caleffi Zone Valve Z55P (Caleffi North America, Inc., Milwaukee, WI). Embodiments that include zone valves 40 on each branch feeder 36 as shown in FIG. 2, may also include at least one ECM circulator pump 38 disposed along the fluid flow conduit, e.g., upstream of the branch feeders 36 as shown, to pump the fluid through at least a portion of the fluid flow conduit 24. In particular embodiments, circulator pump 38 also includes a Bluetooth transmitter 44, shown in phantom, which is configured to capture flow rate and pressure of the fluid passing through the pump/conduit, and to transmit this information to a smart phone or tablet computer, etc.

As also shown, the distribution return portion 30 includes a return manifold 50 in fluid communication with a plurality of parallel branch returns 52, each of which are provided with a purge/shutoff valve 54, such as the Webstone PRO-PAL H-80613 (Nibco, Inc., Elkhart, Indiana). The distribution supply portion 28 includes a combination fluid cleaning device 58 configured to remove air, dirt, and iron (e.g., magnetite) from the fluid. In this regard, the instant inventors have recognized that modern condensing boilers 10', when compared with conventional cast iron boilers 10, tend to be more susceptible to hydronic fluid quality issues such as magnetite and low pH. The inventors recognized that magnetite may block flow of hydronic fluid through sensitive elements such as the heat exchangers of condensing boilers, and ECM circulator pumps, leading to reduced efficiency and premature failure, e.g., burn-out of ECM circulator pump motors. Low pH levels in the hydronic fluid also tends to corrode the heat exchangers of high-efficiency condensing boilers, which are generally made of soft metals such as aluminum or stainless steel rather than cast iron. Cleaning device 58 removes impurities such as air, dirt, and iron/magnetite from the hydronic fluid to help prevent such blockage and stabilize the pH of the hydronic fluid. An example of a combination device 58 suitable for various embodiments is the Caleffi Air & Dirt Separator 546167A with magnet. Those skilled in the art should recognize that although a combination device may be preferred for particular applications, separate air separators, dirt separators, and iron removers may be used in other applications without departing from the scope of the present invention.

An expansion tank bracket 60 with gauge mount, such as the Axiom Hydro-node HN-2 (Axiom Industries Ltd, Saskatoon, Canada) is disposed on the substrate 22 in fluid communication with the conduit 24 and with a water feeder 62, such as the Caleffi Fast Fill valve 573007A or the Watts 911S water feeder (Watts Water Technologies, North Andover, MA). The expansion tank bracket 60 is configured to support a pressure gauge (not shown) and an expansion tank 64, such as the Amtrol #30 (Worthington Industries, West Warwick, RI) thereon. The expansion tank bracket 60 supports the weight of the expansion tank 64 to nominally eliminate the need to use the conduit 24 for such weight support, to reduce mechanical stress on the conduit.

A zone relay 70 is communicably coupled to the at least one ECM circulator pump 38 and to the plurality of zone valves 40, and includes a plurality of thermostat terminals respectively configured for being communicably coupled to a plurality of thermostats 72. The zone relay 70 is configured to capture inputs from the thermostats 72 to control operation of the pump(s) 38 and zone valves 40. Exemplary zone relays include the Caleffi Zone Relay ZSR104 or ZVR104, and the Taco Zone Relay SR504 or ZVC404.

As also shown, in particular embodiments, header 26 optionally includes a valve (e.g., a ball valve) 80 disposed between the closely spaced tees, i.e., between boiler supply port 32 and boiler return port 34. Valve 80 is selectively openable and closable to respectively permit and prevent fluid communication between ports 32, 34. The valve is openable to configure the conduit 24 with hydraulically separated primary and secondary flow paths 86, 88, for use with a condensing boiler 10' connected to the boiler supply and return ports 32, 34. As shown, primary flow path 86 extends through header 26 from supply port 32 to return port 34 to permit some fluid to flow through boiler 10' without passing through conduit 24. The secondary flow path 88 extends through header 26 from return portion 30 to supply portion 28 to permit some fluid to flow in the downstream direction through conduit 24 without having to flow through boiler 10'. Valve 80 is closable to isolate the boiler supply and return ports 32, 34 to effectively convert conduit 24 into a single primary loop for use with a cast iron boiler 10 as shown in FIG. 1. An example of header 26 with closely spaced tees with valve 80 is the Webstone H-88655 Primary and Secondary Loop Purge Valve.

Figure 3:
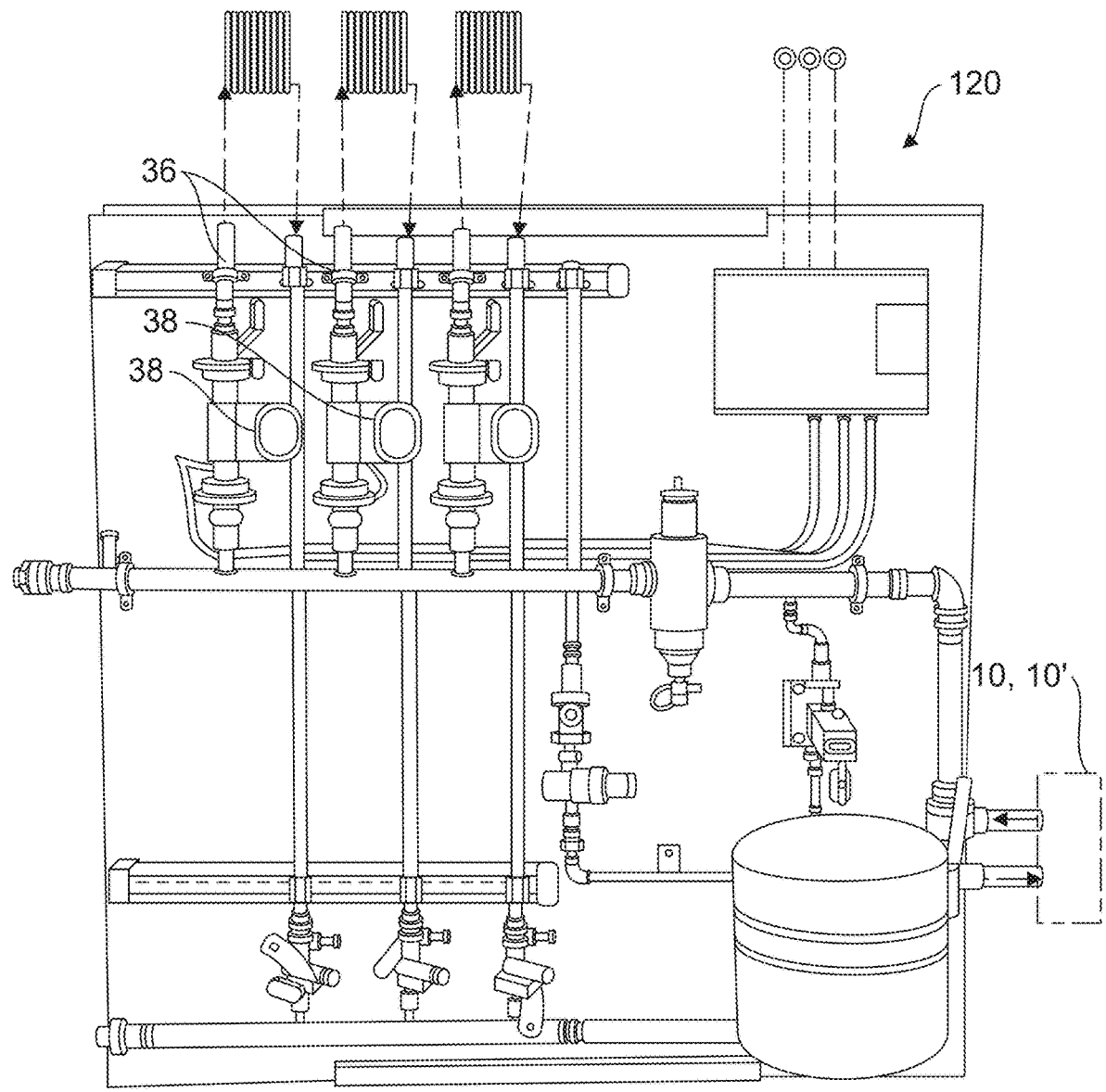
FIG. 3 is a view similar to that of FIG. 2, of an alternative embodiment of the present invention.

Turning now to FIG. 3, an alternate embodiment, shown as boiler board 120, is substantially similar to boiler board 20 of FIG. 2, but for the use of circulator pumps 38, rather than zone valves 40, on each branch feeder 36. (Boiler board 120 is shown with three branch feeders 36, though substantially any number of branch feeders may be used in any of the embodiments shown and described herein.) This distinction also substantially eliminates the need for a circulator pump upstream of the branch feeders as used in the boiler board 20 of FIG. 2.

Figure 4:
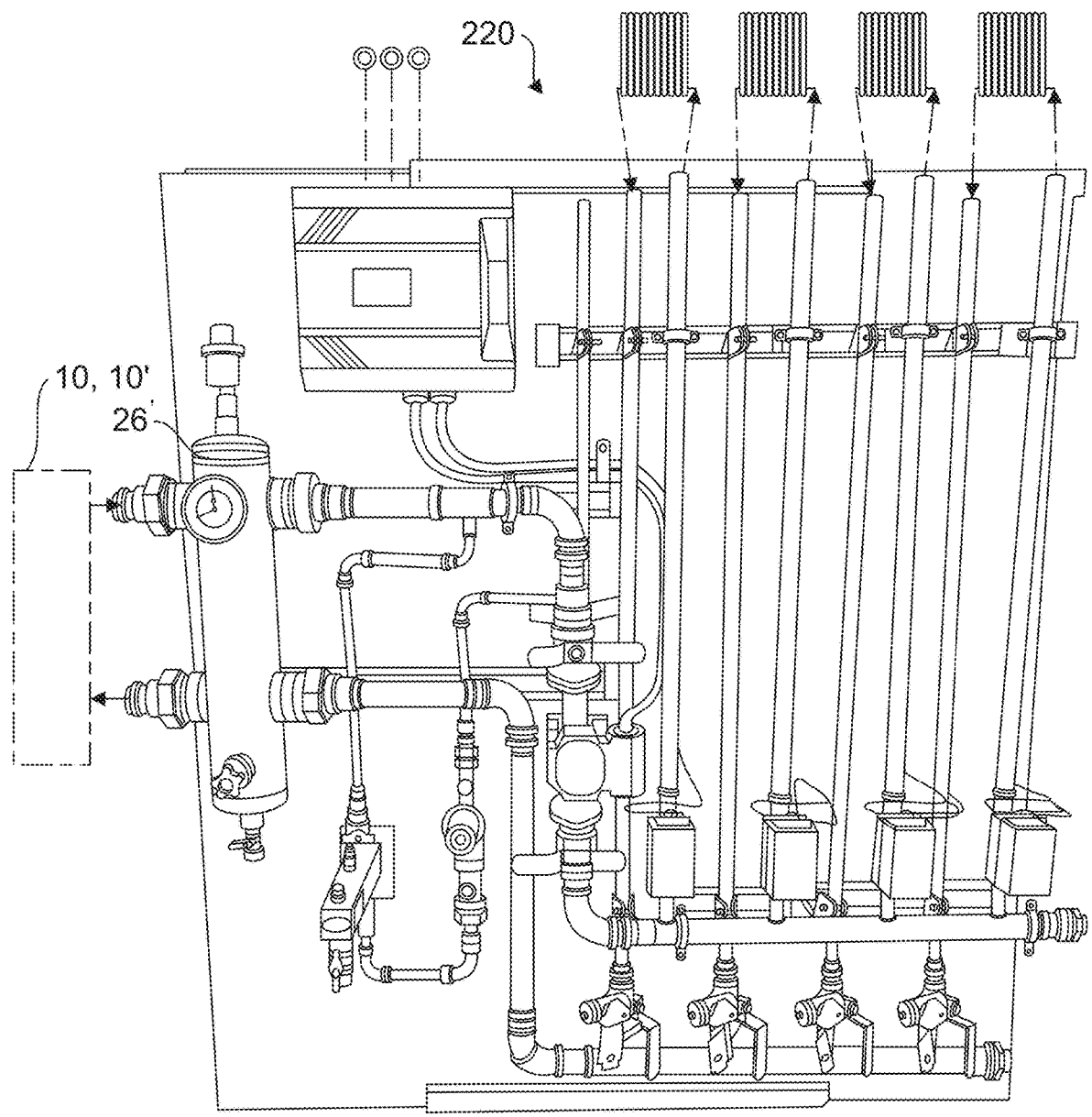
FIG. 4 is a view similar to those of FIGS. 2 and 3, of another alternative embodiment of the present invention.

Referring now to FIG. 4, a further embodiment shown as boiler board 220, is substantially similar to boiler board 20 of FIG. 2, but for the use of a header 26' with closely spaced tees that also integrates the features of fluid cleaning device 58 of FIG. 2. Header 26' thus provides the hydraulic separation (for primary and secondary piping) as described hereinabove, while also removing air, dirt, and iron, along with providing a fluid temp/pressure gauge. An exemplary header 26' is the Purepro HS114NPT Hydraulic Separator available from FW Webb Company, Bedford, MA.

Figure 5:
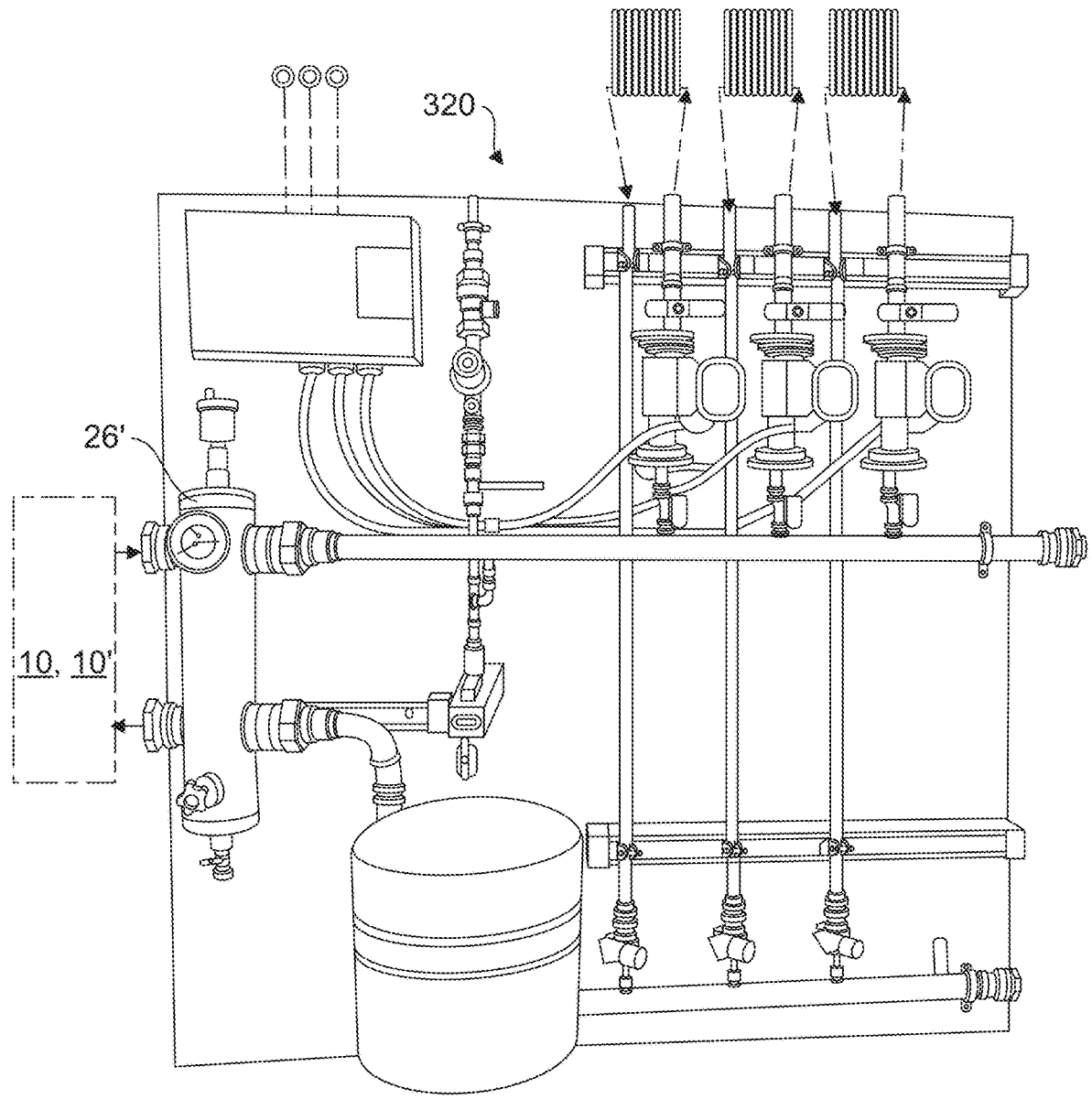
FIG. 5 is a view similar to those of FIGS. 2-4, of yet another alternative embodiment of the present invention.

Referring FIG. 5, a further embodiment shown as boiler board 320, is substantially similar to boiler board 120 of FIG. 3, but for the use of a header 26' as described with respect to boiler board 220 of FIG. 4.

The foregoing embodiments provide pre-fabricated, pre-wired, modular components that form the core of a hydronic heating system, and which may be conveniently installed on site as a single, substantially plug-and-play unit that integrates the features of:
- hydronic piping with pre-installed circulator pumps/zone valves and zone relay;
- expansion tank bracket to eliminate the need to hang an expansion tank on copper tubing;
- air, dirt and magnetic filtration to protect the hydronic water by filtering out the rust and iron/magnetite;
- a header with closely spaced tees and optional integral valve to convert piping from primary to primary/secondary, for use with either cast iron or condensing boilers;
- ECM circulator pumps for enhanced efficiency; and
- Bluetooth technology to provide flow rate and pump pressure to smart phones and laptops.

The present invention has been described in particular detail with respect to various possible embodiments, and those of skill in the art will appreciate that the invention may be practiced in other embodiments. First, the particular naming of the components, capitalization of terms, the attributes, or any other structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. It should be further understood that any of the features described with respect to one of the embodiments described herein may be similarly applied to any of the other embodiments described herein without departing from the scope of the present invention. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims. It should be further understood that any of the features described with respect to one of the embodiments described herein may be similarly applied to any of the other embodiments described herein without departing from the scope of the present invention.

Having thus described the invention, what is claimed is:

1. A modular pre-assembled, pre-fabricated, hydronic system core boiler board, the boiler board comprising:
   a wall mountable substrate;
   a hydronic fluid flow conduit disposed on the substrate, the hydronic fluid flow conduit configured to convey a hydronic heat transfer fluid therethrough, the fluid flow conduit including:
      a header with closely spaced tees, disposed in fluid communication with a distribution supply portion and with a distribution return portion, wherein the heat transfer fluid is configured to flow in a downstream direction from the header to the distribution supply portion, and from the distribution return portion to the header;
      the header forming a single fluid flow h bet ween the closely spaced tees, wherein the distribution supply portion and the distribution return portion are hydraulically independent of one another ide the header;
      a boiler supply port extending from the header in fluid communication with the distribution supply portion, and a boiler return port extending from the header in fluid communication with the distribution return portion, the boiler supply port and the boiler return port forming the closely spaced tees and configured for being disposed in fluid communication with a boiler;
      the distribution supply portion including a supply manifold communicably coupled to a plurality of parallel branch feeders, each of said parallel branch feeders configured for supporting a circulator pump or a zone valve in fluid communication therewith;
      at least one ECM (Electronically Commutated Motor) circulator pump disposed along the fluid flow conduit, the ECM circulator pump configured to pump the fluid through at least a portion of the fluid flow conduit;
      a Bluetooth transmitter communicably coupled to the at least one EMC circulator pump, the transmitter configured to capture and transmit flow rate and pressure of the fluid through the portion of the fluid flow conduit;
      the distribution return portion including a return manifold communicably coupled to a plurality of parallel branch returns, each of said parallel branch returns including a purge/shutoff valve;
      the parallel branch feeders and parallel branch returns configured for being disposed in fluid communication with a distribution system having beating elements;

the distribution supply portion disposed in fluid communication with an air separator, a dirt separator, and an iron remover, respectively configured to remove air, dirt and iron from the fluid;

an expansion tank bracket with gauge mount, disposed on the substrate and in fluid communication with the conduit and with a water feeder, the expansion tank bracket configured to support a pressure gauge and an expansion tank thereon, wherein the expansion tank is supportable by the expansion tank bracket in fluid communication with the conduit and with the pressure gauge; and a zone relay communicably coupled to the at least one ECM circulator pump and any zone valves supported by the parallel branch feeders, the zone relay including a plurality of thermostat terminals respectively configured for being communicably coupled to a plurality of thermostats, the zone relay configured to capture inputs from the plurality of thermostats to control operation of the at least one ECM circulator pump and any zone valves supported by the parallel branch feeders.

2. The boiler board of claim 1, further comprising:
a ball valve disposed in the header between the boiler supply port and the boiler return port, the valve being selectively openable and closable to respectively permit and prevent fluid communication therebetween, wherein the valve is openable to configure the fluid flow conduit with hydraulically separated primary and secondary flow paths for use with a condensing boiler connected to the boiler supply port and the boiler return port, and wherein the valve is closable to isolate the boiler supply port and the boiler return port for use with a cast iron boiler connected to the boiler supply port and the boiler return port.

3. The boiler board of claim 1, further comprising one of said at least one ECM circulator pumps disposed in fluid communication with each of the plurality of branch feeders.

4. The boiler board of claim 3, further comprising a plurality of zone valves respectively disposed in fluid communication with each of the plurality of branch feeders, the plurality of zone valves communicably coupled to the zone relay.

5. The boiler board of claim 1, wherein the air separator, dirt separator, and iron remover are configured as an integrated device.

6. The boiler board of claim 1, wherein the air separator, dirt separator, and iron remover are integrated within the header.

7. A method for producing a modular pre-assembled, pre-fabricated, hydronic system core boiler board, the method comprising:
providing a wall mountable substrate;
disposing a hydronic fluid flow conduit on the substrate, the hydronic fluid flow conduit configured to convey a hydronic heat transfer fluid therethrough, and configuring the fluid flow conduit to include:
a header with closely spaced tees, disposed in fluid communication with a distribution supply portion and with a distribution return portion, wherein the heat transfer fluid is configured to flow in a downstream direction from the header to the distribution supply portion, and from the distribution return portion to the header;
the header forming a single fluid flow path between the closely spaced tees, wherein the distribution supply portion the distribution return portion are hydraulically independent of one another outside the header;

a boiler supply port extending from the header in fluid communication with the distribution supply portion, and a boiler return port extending from the header in fluid communication with the distribution return portion, the boiler supply port and the boiler return port forming the closely spaced tees and configured for being disposed in fluid communication with a boiler;

the distribution supply portion including a supply manifold communicably coupled to a plurality of parallel branch feeders, each of said parallel branch feeders configured for supporting a circulator pump or a zone valve in fluid communication therewith;

at least one ECM (Electronically Commutated Motor) circulator pump disposed along the fluid flow conduit, the ECM circulator pump configured to pump the fluid through at least a portion of the fluid flow conduit;

a Bluetooth transmitter communicably coupled to the at least one EMC circulator pump, the transmitter configured to capture and transmit flow rate and pressure of the fluid through the portion of the fluid flow conduit;

the distribution return portion including a return manifold communicably coupled to a plurality of parallel branch returns, each of said parallel branch returns including a purge/shutoff valve;

the parallel branch feeders and parallel branch returns configured for being disposed in fluid communication with a distribution system having heating elements;

the distribution supply portion disposed in fluid communication with an air separator, a dirt separator, and an iron remover, respectively configured to remove air, dirt and iron from the fluid;

an expansion tank bracket with gauge mount, disposed on the substrate and in fluid communication with the conduit and with a water feeder, the expansion tank bracket configured to support a pressure gauge and an expansion tank thereon, wherein the expansion tank is supportable by the expansion tank bracket in fluid communication with the conduit and with the pressure gauge; and communicably coupling a zone relay to the at least one ECM circulator pump and any zone valves supported by the parallel branch feeders, the zone relay including a plurality of thermostat terminals respectively configured for being communicably coupled to a plurality of thermostats, the zone relay configured to capture inputs from the plurality of thermostats to control operation of the at least one ECM circulator pump and any zone valves supported by the parallel branch feeders.

8. The method of claim 7, further comprising:
disposing a ball valve in the header between the boiler supply port and the boiler return port, the valve being selectively openable and closable to respectively permit and prevent fluid communication therebetween, wherein the valve is openable to configure the fluid flow conduit with hydraulically separated primary and secondary flow paths for use with a condensing boiler connected to the boiler supply port and the boiler return port, and wherein the valve is closable to isolate the boiler supply port and the boiler return port for use with a cast iron boiler connected to the boiler supply port and the boiler return port.

9. The method of claim 7, further comprising disposing one of said at least one ECM circulator pumps in fluid communication with each of the plurality of branch feeders.

10. The method of claim 9, further comprising respectively disposing a plurality of zone valves in fluid communication with each of the plurality of branch feeders, and communicably coupling the plurality of zone valves to the zone relay.

11. The method of claim 7, further comprising configuring the air separator, dirt separator, and iron remover as an integrated device.

12. The method of claim 7, further comprising integrating the air separator, dirt separator, and iron remover within the header.

\* \* \* \* \*

UNITED STATES PATENT AND TRADEMARK OFFICE
CERTIFICATE OF CORRECTION

PATENT NO. : 12,130,025 B2
APPLICATION NO. : 17/495159
DATED : October 29, 2024
INVENTOR(S) : DelConte et al.

Page 1 of 1

It is certified that error appears in the above-identified patent and that said Letters Patent is hereby corrected as shown below:

In the Claims

Column 8, Lines 32-33 (Claim 1), change "the header forming a single fluid flow h bet ween the closely spaced tees" to "the header forming a single fluid flow path between the closely spaced tees"

Column 8, Lines 35-36 (Claim 1), change "independent of one another ide the header" to "independent of one another outside the header"

Column 8, Lines 66-67 (Claim 1), change "having beating elements" to "having heating elements"

Column 9, Line 65-66 (Claim 7), change where "wherein the distribution supply portion the distribution" to "wherein the distribution supply portion and the distribution"

Signed and Sealed this
Twenty-fifth Day of February, 2025

Coke Morgan Stewart
*Acting Director of the United States Patent and Trademark Office*